(12) United States Patent
Aso

(10) Patent No.: US 10,005,356 B2
(45) Date of Patent: Jun. 26, 2018

(54) REFUELING PORTION STRUCTURE OF FUEL TANK

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 433 days.

(21) Appl. No.: 14/832,390

(22) Filed: Aug. 21, 2015

(65) Prior Publication Data

US 2016/0068063 A1 Mar. 10, 2016

(30) Foreign Application Priority Data

Sep. 9, 2014 (JP) ................................. 2014-183616

(51) Int. Cl.
*B60K 15/04* (2006.01)

(52) U.S. Cl.
CPC ...... *B60K 15/04* (2013.01); *B60K 2015/0461* (2013.01); *B60K 2015/0487* (2013.01)

(58) Field of Classification Search
CPC . B60K 15/04; B60K 15/0461; B60K 15/0487
USPC ........................................................ 220/86.2
See application file for complete search history.

(56) References Cited

U.S. PATENT DOCUMENTS

| | | | |
|---|---|---|---|
| 4,572,394 A | | 2/1986 | Tanahashi et al. |
| 6,029,719 A | * | 2/2000 | Hor ...................... B60K 15/035 137/588 |
| 6,446,826 B1 | | 9/2002 | Foltz et al. |
| 2008/0142377 A1 | * | 6/2008 | Suzuki .................. F17C 11/005 206/0.7 |
| 2008/0226965 A1 | * | 9/2008 | Curello ............. H01M 8/04089 429/501 |
| 2013/0340866 A1 | | 12/2013 | Sasaki | |

FOREIGN PATENT DOCUMENTS

| | | |
|---|---|---|
| JP | S60-161623 U | 10/1985 |
| JP | H10-252591 A | 9/1998 |
| JP | 2003184662 A | 7/2003 |
| JP | 2012-162165 A | 8/2012 |
| JP | 2013-071683 A | 4/2013 |

* cited by examiner

*Primary Examiner* — King M Chu

(74) *Attorney, Agent, or Firm* — Oliff PLC

(57) ABSTRACT

A refueling portion structure of a fuel tank has: a refueling pipe that has a refueling port; an opening/closing valve that is provided on a flow path within the refueling pipe; an accommodating portion that is provided at an outer side of the refueling pipe, that accommodates at an interior thereof an adsorbing material that adsorbs vapor fuel that has formed due to the liquid fuel evaporating, that communicates with the flow path further toward the refueling port side than the opening/closing valve, and into which the liquid fuel can flow; an atmospheric air passage, by which the accommodating portion communicates with atmospheric air; and a vapor movement passage, by which the accommodating portion communicates with an engine, and that is for moving vapor that is within the accommodating portion to the engine due to negative pressure from the engine.

5 Claims, 8 Drawing Sheets

REFUELING PORTION STRUCTURE OF FUEL TANK

CROSS-REFERENCE TO RELATED APPLICATION

This application is based on and claims priority under 35 USC 119 from Japanese Patent Application No. 2014-183616 filed on Sep. 9, 2014, the disclosure of which is incorporated by reference herein.

BACKGROUND

Technical Field

The present invention relates to a refueling portion structure of a fuel tank.

Related Art

Japanese Patent Application Laid-Open (JP-A) No. 2012-162165 discloses a refueling portion structure in which an opening/closing valve, that opens a flow path when pushed by a refueling nozzle, is provided on the flow path that is within a refueling pipe for refueling a fuel tank.

In the refueling portion structure disclosed in JP-A No. 2012-162165, when the refueling nozzle is pulled-out from the refueling pipe interior, the opening/closing valve closes the flow path. Therefore, there are cases in which liquid fuel collects on the opening/closing valve when liquid fuel drips down from the refueling nozzle.

SUMMARY

In consideration of the above-described circumstances, an object of an aspect of the present invention is to provide a refueling portion structure of a fuel tank that can reduce the amount of liquid fuel that collects on an opening/closing valve.

A refueling portion structure of a fuel tank of a first aspect of the present invention has: a refueling pipe that has a refueling port into which a refueling nozzle is to be inserted, that is connected to a fuel tank, and that sends liquid fuel, supplied from the refueling nozzle, to the fuel tank; an opening/closing valve that is provided on a flow path within the refueling pipe and closes the flow path, and that, when pushed by the refueling nozzle, opens the flow path; an accommodating portion that is provided at an outer side of the refueling pipe, that accommodates at an interior thereof an adsorbing material that adsorbs vapor fuel that has formed due to the liquid fuel evaporating, that communicates with the flow path further toward the refueling port side than the opening/closing valve, and into which the liquid fuel can flow; an atmospheric air passage, by which the accommodating portion communicates with atmospheric air; and a vapor movement passage, by which the accommodating portion communicates with an engine, and that is for moving vapor that is within the accommodating portion to the engine due to negative pressure from the engine.

In the refueling portion structure of a fuel tank of the first aspect, when the refueling nozzle is inserted-in from the refueling port and pushes the opening/closing valve, the flow path within the refueling pipe is opened, and liquid fuel can be sent to the fuel tank.

Further, when the refueling nozzle is pulled-out, even liquid fuel drips-down from the refueling nozzle and a pool of liquid fuel (hereinafter called "pool" as appropriate) is formed on the opening/closing valve that is in a state of closing the flow path, when the liquid level of the pool becomes greater than or equal to a predetermined value, the liquid fuel flows into the accommodating portion that communicates with the flow path further toward the refueling port side than the opening/closing valve. Therefore, the amount of liquid fuel that collects on the opening/closing valve can be reduced. Further, the liquid fuel that flows into the accommodating portion evaporates and becomes vapor fuel, and is adsorbed by the adsorbing material.

Thereafter, when the engine is started-up, due to negative pressure from the engine, vapor (atmospheric air), that has flowed into the accommodating portion through the atmospheric air passage, passes through the vapor movement passage and moves to the engine. Accompanying this movement of vapor, vapor fuel is desorbed from the adsorbing material, and moves to the engine.

In this way, in the above-described refueling portion structure of a fuel tank, liquid fuel that has flowed into the accommodating portion evaporates, and thereafter, moves to the engine. Thereafter, the effect of being able to reduce the amount of liquid fuel that collects on the opening/closing valve is achieved also at times of refueling from the next time on.

In a refueling portion structure of a fuel tank of a second aspect of the present invention, in the refueling portion structure of a fuel tank of the first aspect, an absorbent material that absorbs the liquid fuel is accommodated at the interior of the accommodating portion.

In the refueling portion structure of a fuel tank of the second aspect, the liquid fuel that has flowed into the accommodating portion is absorbed by the absorbent material. The absorbed liquid fuel spreads over a wide range of the absorbent material due to capillary action, and therefore, the surface area of contact with vapor (atmospheric air) increases, and evaporation is promoted. Due thereto, the liquid fuel that has flowed into the accommodating portion can be evaporated efficiently.

In a refueling portion structure of a fuel tank of a third aspect of the present invention, in the refueling portion structure of a fuel tank of the second aspect, the interior of the accommodating portion is partitioned, by a partitioning member in which are provided openings of a size that restricts passage of the adsorbing material and the absorbent material, into an adsorbing material accommodating space in which the adsorbing material is accommodated, and an absorbent material accommodating space in which the absorbent material is accommodated, and the adsorbing material accommodating space communicates with the atmospheric air passage, and the absorbent material accommodating space communicates with the flow path further toward the refueling port side than the opening/closing valve.

In the refueling portion structure of a fuel tank of the third aspect, the liquid fuel that has flowed into the absorbent material accommodating space is absorbed by the absorbent material. The liquid fuel that is absorbed by the absorbent material evaporates and becomes vapor fuel, and passes-through the openings of the partitioning member, and is adsorbed by the adsorbing material of the adsorbing material accommodating space.

Here, because the absorbent material accommodating space communicates with the flow path further toward the refueling port side than the opening/closing valve, the liquid fuel that flows-out from the pool on the opening/closing valve is absorbed efficiently by the absorbent material, and can be made to evaporate. Further, because the adsorbing material accommodating space communicates with the atmospheric air passage, the vapor fuel can be adsorbed by the adsorbing material before reaching the atmospheric air passage, and thus, vapor fuel passing through the atmospheric air passage and escaping to the exterior can be suppressed.

In a refueling portion structure of a fuel tank of a fourth aspect of the present invention, in the refueling portion structure of a fuel tank of the second aspect, the absorbent material is structured by fibers.

In the refueling portion structure of a fuel tank of the fourth aspect, because the absorbent material is structured by fibers, the surface area of contact between vapor (atmospheric air) and the absorbed liquid fuel can be increased more, as compared with a case in which the absorbent material is made to be a porous substance for example. Due thereto, the liquid fuel can be made to evaporate even more efficiently.

In a refueling portion structure of a fuel tank of a fifth aspect of the present invention, in the refueling portion structure of a fuel tank of the second aspect, the absorbent material is structured by fibers, and the adsorbing material is dispersed between the fibers of the absorbent material.

In the refueling portion structure of a fuel tank of the fifth aspect, because the absorbent material is structured by fibers, the surface area of contact between vapor (atmospheric air) and the absorbed liquid fuel can be increased more, as compared with a case in which the absorbent material is made to be a porous substance for example. Due thereto, the liquid fuel can be made to evaporate even more efficiently.

Further, because the adsorbing material is dispersed between the fibers of the absorbent material, the internal structure of the accommodating portion can be made to be simple as compared with a case in which, for example, the interior of the accommodating portion is partitioned into a space that accommodates the adsorbing material and a space that accommodates the absorbent material.

In a refueling portion structure of a fuel tank of a sixth aspect of the present invention, in the refueling portion structure of a fuel tank of the first aspect, the accommodating portion is disposed in a peripheral direction of the refueling pipe.

In the refueling portion structure of a fuel tank of the sixth aspect, because the accommodating portion is disposed in the peripheral direction of the refueling pipe, the volume of the accommodating portion can be increased while the amount by which the accommodating portion juts-out from the refueling pipe in the radial direction is restrained.

The refueling portion structure of a fuel tank of the first aspect of the present invention has the excellent effect that the amount of liquid fuel that collects on the opening/closing valve can be reduced.

The refueling portion structure of a fuel tank of the second aspect of the present invention has the excellent effect that the vapor fuel that has flowed into the accommodating portion can efficiently be made to evaporate.

The refueling portion structure of a fuel tank of the third aspect of the present invention has the excellent effects that the liquid fuel that has flowed into the accommodating portion can efficiently be made to evaporate, and vapor fuel escaping from the atmospheric air passage to the exterior can be suppressed.

The refueling portion structure of a fuel tank of the fourth aspect of the present invention has the excellent effect that the liquid fuel that has flowed into the accommodating portion can be more efficiently made to evaporate.

The refueling portion structure of a fuel tank of the fifth aspect of the present invention has the excellent effects that the liquid fuel that has flowed into the accommodating portion can be more efficiently made to evaporate, and the internal structure of the accommodating portion can be made to be simple.

The refueling portion structure of a fuel tank of the sixth aspect of the present invention has the excellent effect that the volume of the accommodating portion can be increased, while the amount by which the accommodating portion juts-out from the refueling pipe in the radial direction is restrained.

BRIEF DESCRIPTION OF THE DRAWINGS

Exemplary embodiments of the present invention will be described in detail based on the following figures, wherein.

DETAILED DESCRIPTION

Refueling portion structures of a fuel tank of embodiments of the present invention are described hereinafter.

First Embodiment

A refueling portion structure of a fuel tank (hereinafter simply called "refueling portion structure") 20 of a first embodiment of the present invention is described hereinafter with reference to FIG. 1 through FIG. 6. Note that arrow UP that is shown appropriately in these drawings indicates the vehicle upper side, and arrow X indicates the insertion direction of a refueling nozzle 100 that is described later.

Figure 1:
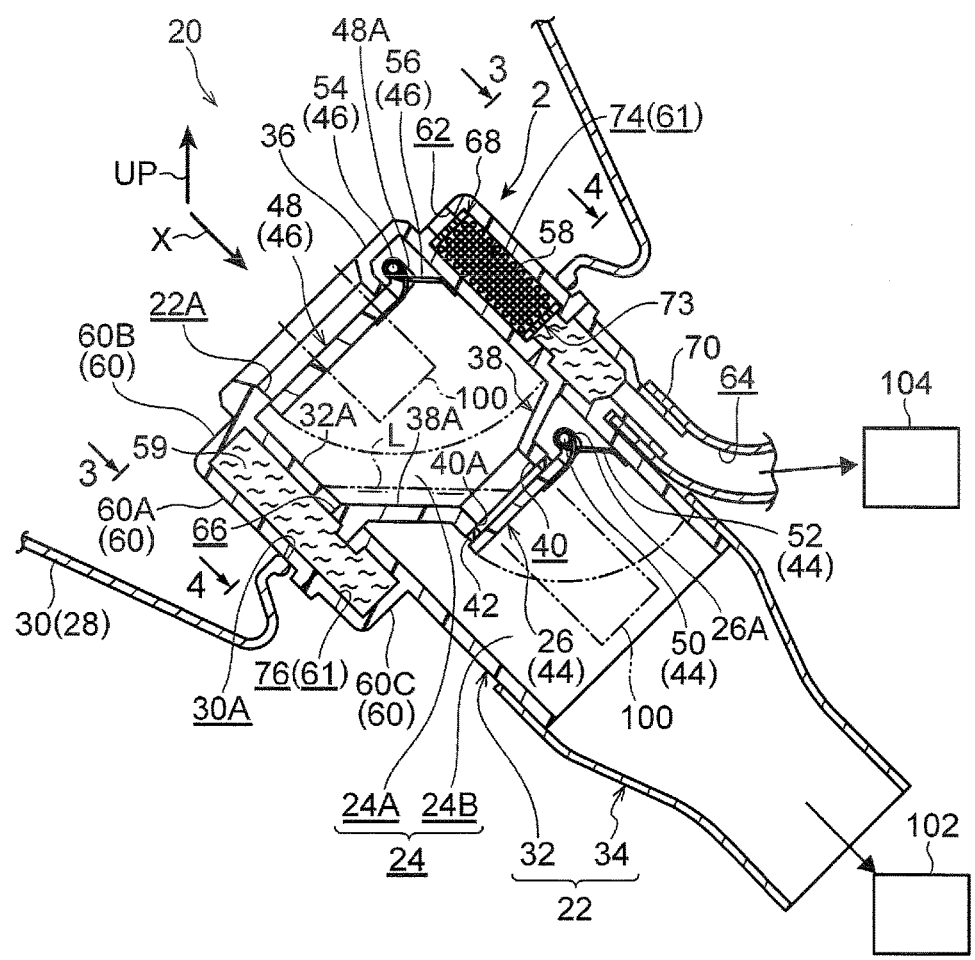
FIG. 1 is a cross-sectional view showing a refueling portion structure of a fuel tank of a first embodiment of the present invention.

As shown in FIG. 1, the refueling portion structure 20 of the present embodiment has: a filler pipe 22 that has a refueling port 22A into which the refueling nozzle 100 is inserted, and that is connected to a fuel tank 102 installed in a vehicle, and that sends, to the fuel tank 102, liquid fuel that is supplied from the refueling nozzle 100; and an opening/closing valve 26 that is provided on a flow path 24 within the filler pipe 22 and closes the flow path 24, and that, when pushed by the refueling nozzle 100, opens the flow path 24. Note that the filler pipe 22 of the present embodiment is an example of the refueling pipe in the present invention.

The filler pipe 22 extends toward the fuel tank 102 from a concave portion 30 that is concave toward the vehicle body inner side and is formed in an outer panel that structures a vehicle body 28. In the present embodiment, the fuel tank 102 is positioned lower than the concave portion 30, and the filler pipe 22 extends at a downward incline from the concave portion 30 toward the fuel tank 102. Note that the direction in which the filler pipe 22 extends is not particularly limited provided that the filler pipe 22 can cause liquid fuel to flow from the refueling port 22A side toward the fuel tank 102.

The filler pipe 22 has: a refueling port member 32 that is cylindrical tube shaped, and structures the refueling port 22A, and is mounted to the concave portion 30; and a pipe main body 34 that is cylindrical tube shaped and to whose one end portion (near side end portion) the refueling port member 32 is mounted, and whose other end portion (far side end portion) is connected to the fuel tank 102.

Note that, in the present embodiment, when merely "the near side" is used, it means the near side of the filler pipe 22, i.e., the refueling port 22A side, and, when merely "the far side" is used, it means the far side of the filler pipe 22, i.e., the fuel tank 102 side. Further, when merely "the radial direction" is used, it means the radial direction of the filler pipe 22. When "the axial direction" is used, it means the axial direction of the filler pipe 22. When "the peripheral direction" is used, it means the peripheral direction of the filler pipe 22.

The refueling port member 32 is mounted to the concave portion 30 in a state of being inserted in a mounting hole 30A that is formed in the concave portion 30, and the near side end portion of the refueling port member 32 is exposed to the vehicle body outer side. Further, an overhanging portion 36, that is annular and juts-out toward the radial direction inner side, is formed at the near side end portion of the refueling port member 32. The opening that is formed at the inner side of this overhanging portion 36 is the refueling port 22A.

Further, in the present embodiment, the refueling port 22A opens at an upward incline toward the vehicle body outer side. Note that the present invention is not limited to this structure, and the refueling port 22A may open directly upward or in a horizontal direction, provided that it faces toward the vehicle outer side. Further, the refueling port 22A is formed to a hole diameter that is such that the refueling nozzle 100 can be inserted therein.

A tube portion 38, that is substantially cylindrical tube shaped and is shaped such that the diameter thereof gradually decreases from the near side toward the far side, is formed at an axial direction intermediate portion (in the present embodiment, in a vicinity of the central portion) of the refueling port member 32. An opening 40 that is formed at the far side end portion of this tube portion 38 is made to have an opening diameter that is slightly larger than the nozzle diameter of the refueling nozzle 100. Due to the tube portion 38, when the refueling nozzle 100 is inserted-in from the refueling port 22A, the distal end portion of the refueling nozzle 100 contacts an inner peripheral surface 38A of the tube portion 38 and is guided toward the opening 40.

Further, a rubber seal 42 that is annular is mounted to a hole edge 40A of the opening 40 of the tube portion 38 (in the present embodiment, the far side end surface of the tube portion 38), along the hole edge 40A.

A first opening/closing portion 44 for opening and closing the opening 40 is provided at the refueling port member 32. The opening 40 is closed by the opening/closing valve 26 that structures this first opening/closing portion 44.

Further, a second opening/closing portion 46 for opening and closing the refueling port 22A is provided at the refueling port member 32, further toward the near side than the first opening/closing portion 44. The refueling port 22A is closed by an outer cover 48 that structures this second opening/closing portion 46.

Therefore, the flow path 24 that is within the filler pipe 22 is structured to include a first flow path 24A from the outer cover 48 to the opening/closing valve 26, and a second flow path 24B from the opening/closing valve 26 to the fuel tank 102.

The first opening/closing portion 44 has the opening/closing valve 26, a supporting shaft 50, and an urging spring 52. The opening/closing valve 26 is formed in the shape of a flat plate that is substantially circular, and the diameter thereof is made to be larger than that of the opening 40 of the tube portion 38. As shown in FIG. 1, in the state in which the opening/closing valve 26 is closed (hereinafter called "closed state" as appropriate), the near side surface of the opening/closing valve 26 contacts the rubber seal 42 provided at the opening edge 40A, and the region between the tube portion 38 and the opening/closing valve 26 is sealed.

A pair of bearing portions 26A are provided at an end portion of the opening/closing valve 26. The supporting shaft 50, that rotatably supports the opening/closing valve 26, is inserted-through these bearing portions 26A. The both end portions of the supporting shaft 50 are respectively mounted to a peripheral wall portion 32A of the refueling port member 32. Therefore, the opening 40 is opened and closed due to the opening/closing valve 26 being rotated around the supporting shaft 50. Further, the urging spring 52 is wound on the supporting shaft 50. The urging spring 52 urges the opening/closing valve 26 in the closing direction. As an example, a torsion coil spring is used as the urging spring 52 of the present embodiment. Here, by pushing the opening/closing valve 26 by a force that is larger than the urging force of the urging spring 52, the opening/closing valve 26 rotates around the supporting shaft 50 against the urging force of the urging spring 52, and the opening 40 is opened.

The second opening/closing portion 46 has the outer cover 48, a supporting shaft 54, and an urging spring 56. The outer cover 48 is formed in the shape of a flat plate that is substantially circular, and the diameter thereof is made to be larger than that of the refueling port 22A. Further, the diameter of the outer cover 48 is formed to be larger than the diameter of the refueling port 22A, and, as shown in FIG. 1, in the state in which the outer cover 48 is closed (hereinafter called "closed state" as appropriate), the outer peripheral edge portion of the outer cover 48 and the hole edge of the refueling port 22A contact one another.

Here, a pair of bearing portions 48A are provided at an end portion of the outer cover 48. The supporting shaft 54, that rotatably supports the outer cover 48, is inserted-through these bearing portions 48A. The both end portions of the supporting shaft 54 are respectively mounted to the peripheral wall portion 32A of the refueling port member 32. Therefore, the refueling port 22A is opened and closed due to the outer cover 48 being rotated around the supporting shaft 54. Further, the urging spring 56 is wound on the supporting shaft 54. The urging spring 56 urges the outer cover 48 in the closing direction. As an example, a torsion coil spring is used as the urging spring 56 of the present embodiment. Here, by pushing the outer cover 48 by a force that is larger than the urging force of the urging spring 56, the outer cover 48 rotates around the supporting shaft 54 against the urging force of the urging spring 56, and the refueling port 22A is opened.

Further, as shown in FIG. 1, the refueling portion structure 20 of the present embodiment has: an accommodating portion 60 that is provided at the outer side of the filler pipe 22, and that accommodates an adsorbing material 58 and an absorbent material 59 in the interior thereof (hereinafter called "inner space 61" as appropriate), and that communicates with the flow path 24 further toward the refueling port 22A side (the near side) than the opening/closing valve 26; an atmospheric air passage 62 that communicates the accommodating portion 60 with the atmosphere; and a vapor movement passage 64 that communicates the accommodating portion 60 and an engine 104.

Figure 3:
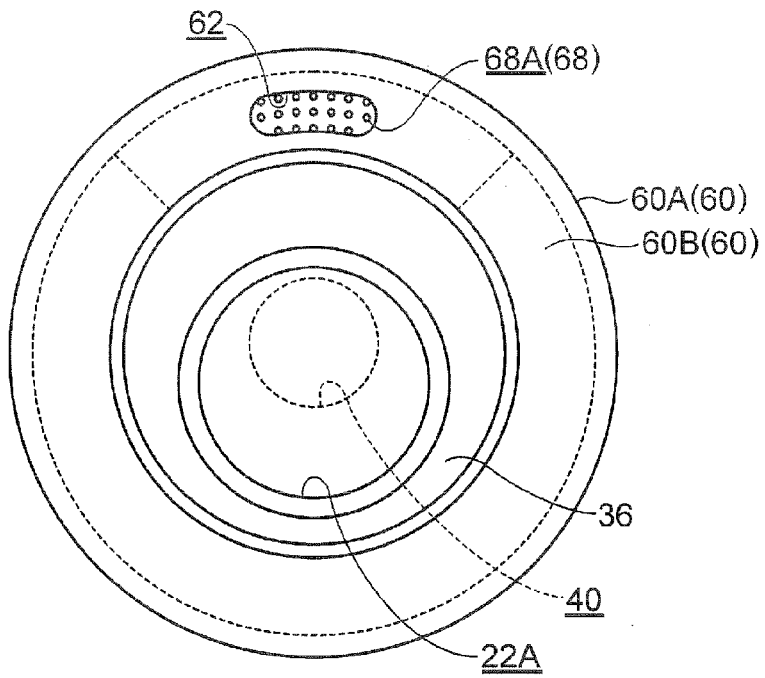
FIG. 3 is a drawing in which the refueling portion structure of the fuel tank of FIG. 1 is seen from the direction of arrow 3.

As shown in FIG. 1 and FIG. 3, the accommodating portion 60 is formed at the radial direction outer side of the peripheral wall portion 32A of the refueling port member 32, and is disposed in the peripheral direction (in the present embodiment, is disposed so as to be continuous in the peripheral direction). Concretely, the accommodating portion 60 is structured to include: the peripheral wall portion 32A; an outer wall portion 60A that is disposed at the radial direction outer side of the peripheral wall portion 32A so as to be separated therefrom, and that is continuous in the peripheral direction; an upper wall portion 60B that is annular, and is connected to the peripheral wall portion 32A, and juts-out toward the radial direction inner side from the axial direction near side end portion of the outer wall portion 60A; and a lower wall portion 60C that is annular, and is connected to the peripheral wall portion 32A, and juts-out toward the radial direction inner side from the axial direction far side end portion of the outer wall portion 60A. The inner space 61 is continuous in the peripheral direction.

A flow-in passage 66, that communicates the first flow path 24A and the accommodating portion 60 (the inner space 61 of the accommodating portion 60), is formed in the peripheral wall portion 32A. This flow-in passage 66 is structured so as to cause the liquid fuel, that has collected on the opening/closing valve 26 that is in the closed state, to flow into the accommodating portion 60. Concretely, as shown in FIG. 1, the flow-in passage 66 of the present embodiment is a through-hole that is formed in the lower side of the peripheral wall portion 32A, and extends at a downward incline from the first flow path 24A side toward the accommodating portion 60 side. Note that the direction in which the flow-in passage 66 extends and the position at which the flow-in passage 66 is formed at the peripheral wall portion 32A are not particularly limited, provided that the flow-in passage 66 can cause the liquid fuel, that has collected on the opening/closing valve 26 that is in the closed state, to flow into the accommodating portion 60.

Figure 2:
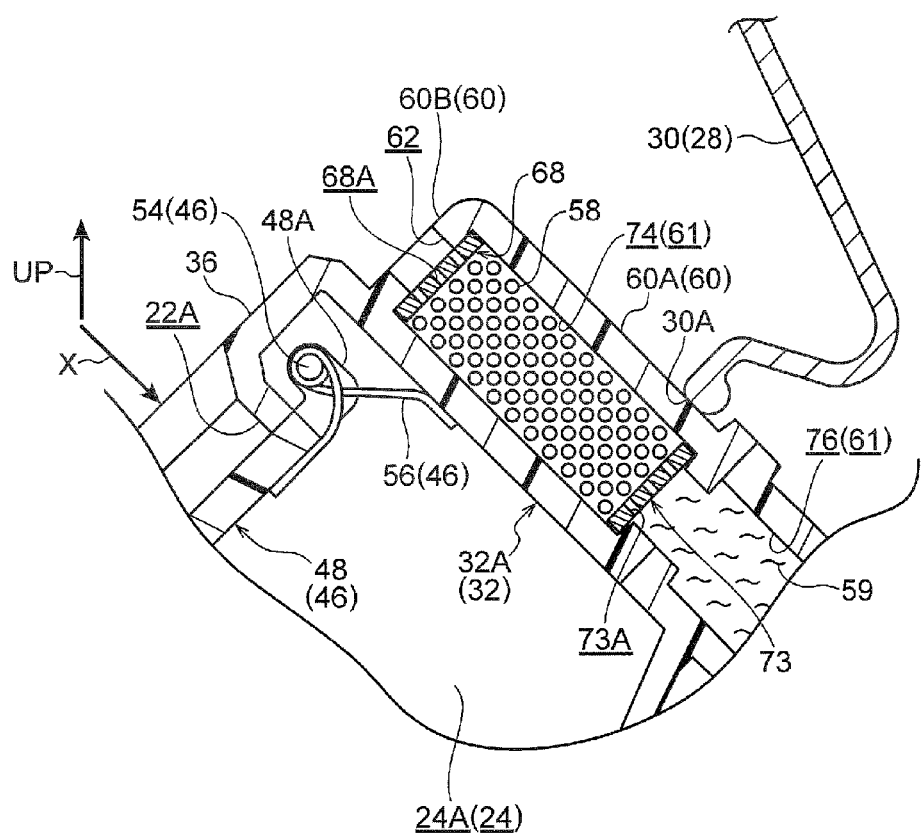
FIG. 2 is an enlarged view of the portion, that is indicated by arrow 2, of the refueling portion structure of the fuel tank of FIG. 1.

As shown in FIG. 2 and FIG. 3, the atmospheric air passage 62 is a through-hole that is formed in the upper wall portion 60B of the accommodating portion 60, and communicates the atmosphere and the accommodating portion 60. In the present embodiment, the atmospheric air passage 62 is formed at one side (in FIG. 1, the upper side) in the radial direction of the upper wall portion 60B. Further, a plate member 68 is mounted to the inner surface of the upper wall portion 60B, so as to cover the opening of the atmospheric air passage 62 from the inner side. Through-holes 68A, that are diameters that permit the passage of vapor (atmospheric air) and impede passage of the adsorbing material 58, are formed in the plate member 68 (see FIG. 2 and FIG. 3).

As shown in FIG. 1, one end of the vapor movement passage 64 is connected to a connection port portion 70 that is tubular and is formed at the lower wall portion 60C of the accommodating portion 60, and the other end of the vapor movement passage 64 is connected to an intake path of the engine 104. This vapor movement passage 64 is a passage for moving the vapor within the accommodating portion 60 (in the present embodiment, atmospheric air and vapor fuel) to the engine 104 due to negative pressure from the engine 104. Further, the connection port portion 70 is formed at one side (in FIG. 1, the upper side) in the radial direction of the lower wall portion 60C, i.e., at the same side in the radial direction as the atmospheric air passage 62.

Figure 4:
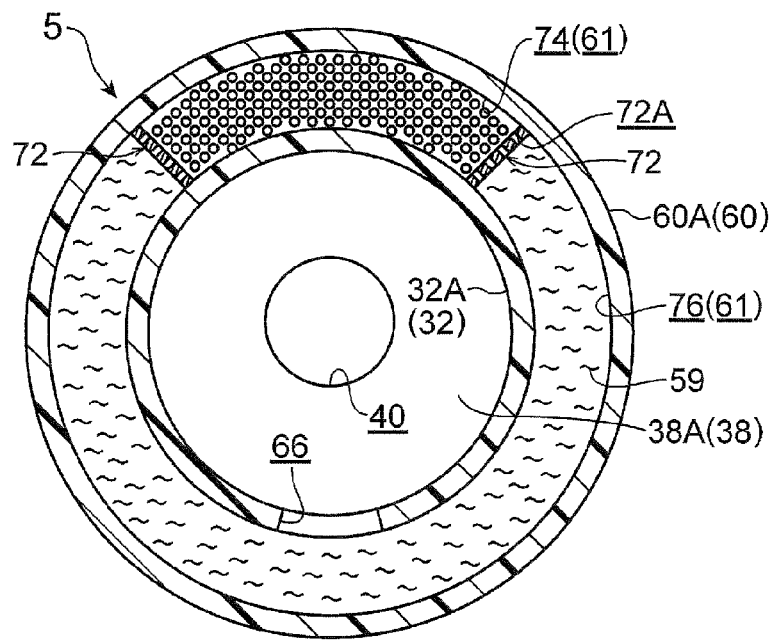
FIG. 4 is a cross-sectional view in which the refueling portion structure of the fuel tank of FIG. 1 is cut along line 4-4.

Further, partitioning members 72 (see FIG. 4) that are plate-shaped and a partitioning member 73 (see FIG. 2) that is plate shaped are provided within the accommodating portion 60. Due to the partitioning members 72 and the partitioning member 73, the inner space 61 of the accommodating portion 60 is partitioned into an adsorbing material accommodating space 74 in which the adsorbing material 58 is accommodated, and an absorbent material accommodating space 76 in which the absorbent material 59 is accommodated. Concretely, as shown in FIG. 4, the partitioning members 72 are respectively disposed within the accommodating portion 60 at the peripheral direction both sides of the atmospheric air passage 62 (see FIG. 3). These partitioning members 72 respectively extend along the axial direction from the inner surface of the upper wall portion 60B toward the far side, and the far side end portions thereof are joined together by the partitioning member 73 that extends along the peripheral direction. Further, the both end portions, in the plate-width direction, of the partitioning members 72 contact the outer surface of the peripheral wall portion 32A and the inner surface of the outer wall portion 60A, respectively. Similarly, the both end portions, in the plate-width direction, of the partitioning member 73 contact the outer surface of the peripheral wall portion 32A and the inner surface of the outer wall portion 60A, respectively. The adsorbing material accommodating space 74 that communicates with the atmospheric air passage 62 is formed within the accommodating portion 60 by the partitioning members 72, the partitioning member 73, the peripheral wall portion 32A, the outer wall portion 60A, and the plate member 68. On the other hand, in the present embodiment, the portion, that is other than the adsorbing material accommodating space 74, of the accommodating portion 60 interior is made to be the absorbent material accommodating space 76. Therefore, the absorbent material accommodating space 76 communicates with the flow-in passage 66.

Figure 5:
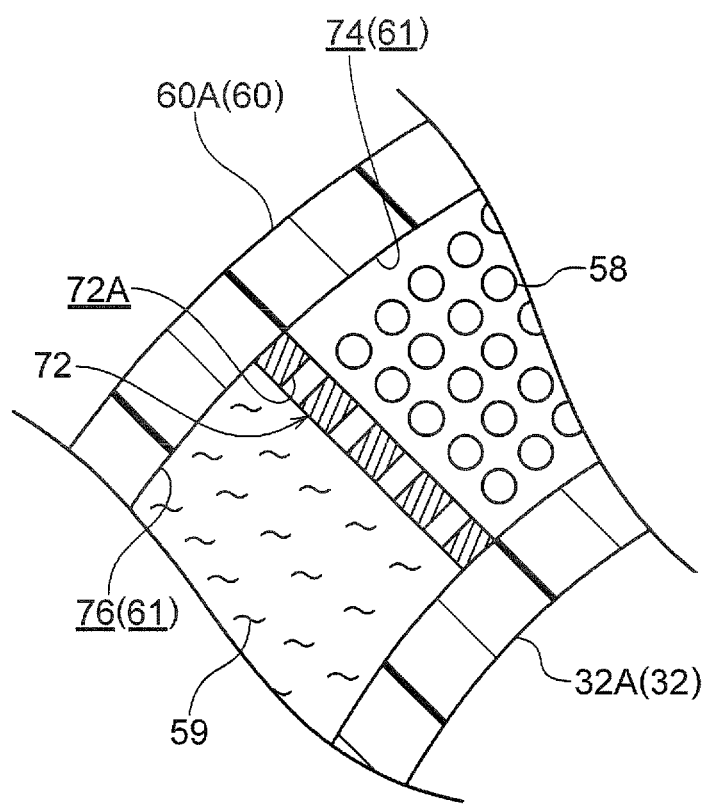
FIG. 5 is an enlarged view of the portion, that is indicated by arrow 5, of the refueling portion structure of the fuel tank of FIG. 4.
Figure 6:
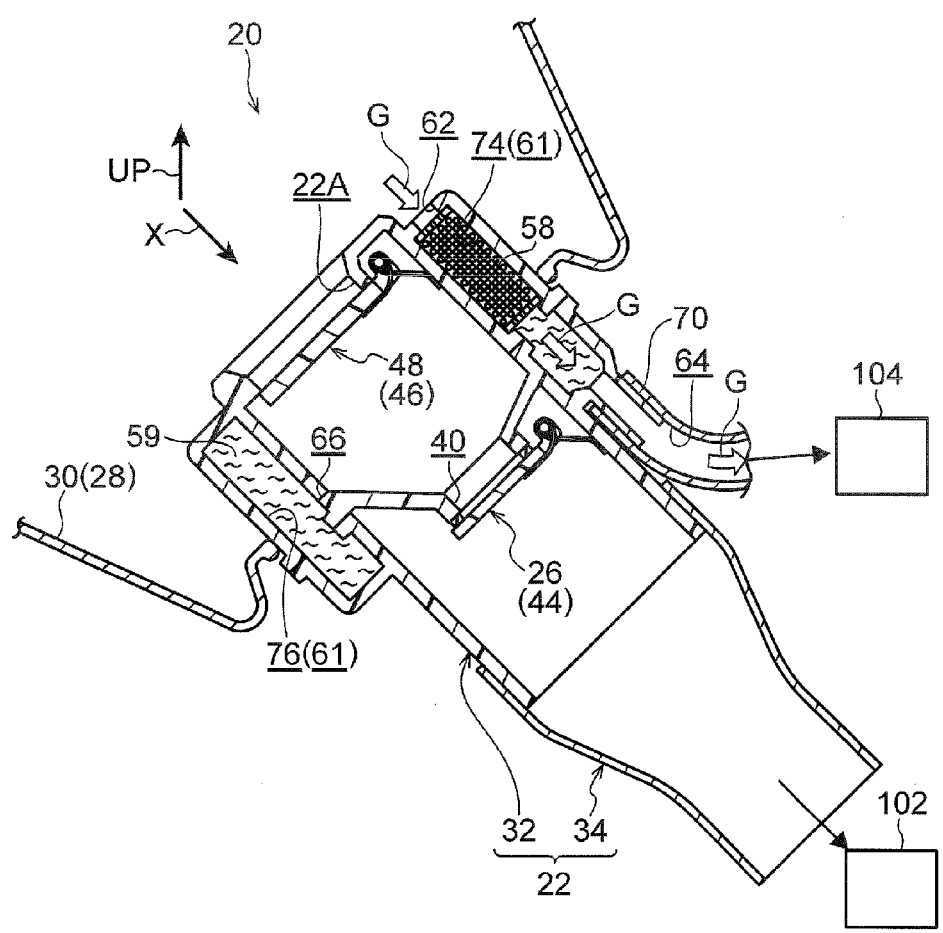
FIG. 6 is a cross-sectional view showing the refueling portion structure of the fuel tank of FIG. 1 in a state in which negative pressure is applied from an engine.

As shown in FIG. 5, openings 72A, that are a size that restricts passage of the adsorbing material 58 and the absorbent material 59, are formed in the partitioning members 72. Note that, in the present embodiment, through-holes are formed in the plate-shaped partitioning members 72 and these through-holes are made to be the openings 72A, but the present invention is not limited to this structure. For example, the partitioning members 72 may be made to be mesh-like members. In this case, the openings (gaps) of the mesh are the openings 72A. Similarly, as shown in FIG. 2, openings 73A, that are a size that restricts passage of the adsorbing material 58 and the absorbent material 59, are formed in the partitioning member 73. Note that, in the present embodiment, through-holes are formed in the plate-shaped partitioning member 73 and these through-holes are made to be the openings 73A, but the present invention is not limited to this structure. For example, the partitioning member 73 may be made to be a mesh-like member. In this case, the openings (gaps) of the mesh are the openings 73A.

Note that, in the present embodiment, the two partitioning members 72 and the partitioning member 73 are used in order to partition the inner space 61 of the accommodating portion 60, but the present invention is not limited to this structure. For example, there may be a structure in which a partitioning member is formed by bending a plate member into a substantial U-shape, and the inner side of the substantial U-shape is made to be the adsorbing material accommodating space 74, and the outer side of the substantial U-shape is made to be the absorbent material accommodating space 76.

A large amount of the adsorbing material 58, that adsorbs the vapor fuel that is formed due to the liquid fuel evaporating, is accommodated within the adsorbing material accommodating space 74. For example, activated carbon is an example of the adsorbing material 58.

The absorbent material 59 that absorbs liquid fuel is accommodated in the absorbent material accommodating space 76. For example, a porous substance (sponge or the like), a woven fabric that is structured by fibers, a non-woven fabric, and paper are examples of the absorbent material 59. Further, there may be a structure in which plural absorbent materials 59 are accommodated in the absorbent material accommodating space 76. Or, there may be a structure in which the absorbent material 59, that is molded into substantially the same shape as the absorbent material accommodating space 76, is accommodated in the absorbent material accommodating space 76. Note that the absorbent material 59 of the present embodiment is structured by fibers.

Operation and effects of the refueling portion structure 20 of the present embodiment are described next. In the refueling portion structure 20, the refueling nozzle 100 is inserted-in from the refueling port 22A, and pushes and opens the outer cover 48 and the opening/closing valve 26 that is at the far side of the outer cover 48. Due thereto, the flow path 24 is opened, and liquid fuel can be refueled into the fuel tank 102 from the refueling nozzle 100.

After refueling of the fuel tank 102 from the refueling nozzle 100 is completed, the refueling nozzle 100 is pulled-out from the filler pipe 22. Here, in a case in which liquid fuel drips-down from the distal end of the nozzle before the refueling nozzle 100 is pulled-out from the refueling port 22A, when the opening/closing valve 26 closes, the liquid fuel collects on the opening/closing valve 26 and a pool L (shown by the two-dot chain line in FIG. 1) is formed. When the liquid level of this pool L becomes greater than or equal to a predetermined value, liquid fuel flows through the flow-in passage 66 into the accommodating portion 60 (the absorbent material accommodating space 76). Therefore, the amount of the liquid fuel that collects on the opening/closing valve 26 is reduced.

Then, the liquid fuel that has flowed into the absorbent material accommodating space 76 evaporates and becomes vapor fuel. Here, because the absorbent material 59 is accommodated in the absorbent material accommodating space 76, the liquid fuel that has flowed into the absorbent material accommodating space 76 is absorbed by the absorbent material 59. The liquid fuel that is absorbed by the absorbent material 59 spreads over a wide range of the absorbent material 59 due to capillary action, and therefore, the surface area of contact with vapor (atmospheric air) increases, and evaporation is promoted. Due thereto, the liquid fuel that has flowed into the absorbent material accommodating space 76 is evaporated efficiently, and thus, the absorbent material 59 dries easily.

Further, because the absorbent material accommodating space 76 communicates with the first flow path 24A through the flow-in passage 66, the liquid fuel that has flowed-out from the pool L on the opening/closing valve 26 is absorbed efficiently by the absorbent material 59, and can be evaporated.

The vapor fuel within the absorbent material accommodating space 76 passes-through the openings 72A of the partitioning members 72 and the openings 73A of the partitioning member 73, and moves into the adsorbing material accommodating space 74, and is adsorbed by the adsorbing material 58. Here, because the adsorbing material accommodating space 74 communicates with the atmospheric air passage 62, the vapor fuel can be adsorbed by the adsorbing material 58 before reaching the atmospheric air passage 62, and thus, vapor fuel passing through the atmospheric air passage 62 and escaping to the exterior can be suppressed.

Thereafter, when the engine 104 is started-up, the atmospheric air, that has passed-through the atmospheric air passage 62 and flowed into the adsorbing material accommodating space 74, passes through the vapor movement passage 64 and moves to the engine 104 (in FIG. 6, the flow of the vapor is shown by arrow G), due to the negative pressure from the intake path (the intake manifold) of the engine 104. Accompanying this movement of vapor, vapor fuel is desorbed (purged) from the adsorbing material 58 and moves to the engine 104, and is used as energy.

In this way, in the refueling portion structure 20, the liquid fuel, that has flowed into the accommodating portion 60 from the pool L, evaporates, and thereafter, moves to the engine 104 and is used as energy. Thus, at times of refueling from the next time on, liquid fuel is absorbed by the absorbent material 59, and vapor fuel can be adsorbed by the adsorbing material 58. Therefore, the amount of liquid fuel that collects on the opening/closing valve 26 can be reduced.

In the refueling portion structure 20, because the absorbent material 59 is structured by fibers, the surface area of contact between vapor (atmospheric air) and the absorbed liquid fuel can be increased more. Due thereto, the liquid fuel can be evaporated more efficiently.

Further, in the refueling portion structure 20, because the accommodating portion 60 is disposed in the peripheral direction of the filler pipe 22, the volume of the accommodating portion 60 can be increased while the amount of jutting-out of the accommodating portion 60 from the filler pipe 22 in the radial direction (the amount of jutting-out from the outer surface of the peripheral wall surface 32A) is suppressed. Due thereto, even more liquid fuel can be made to flow into the absorbent material accommodating space 76.

Still further, the liquid fuel, that has flowed into the absorbent material accommodating space 76, spreads, due to the capillary action of the absorbent material 59, to a position higher than the liquid surface of the pool L. Therefore, the liquid fuel can be absorbed efficiently with respect to the volume of the absorbent material accommodating space 76, and thus, it is easy to ensure the amount of liquid that is absorbed.

Second Embodiment

A refueling portion structure 80 of a second embodiment of the present invention is described next with reference to FIGS. 7 through 9. Note that structures that are similar to the first embodiment are denoted by the same reference numerals, and description thereof is omitted as appropriate.

Figure 7:
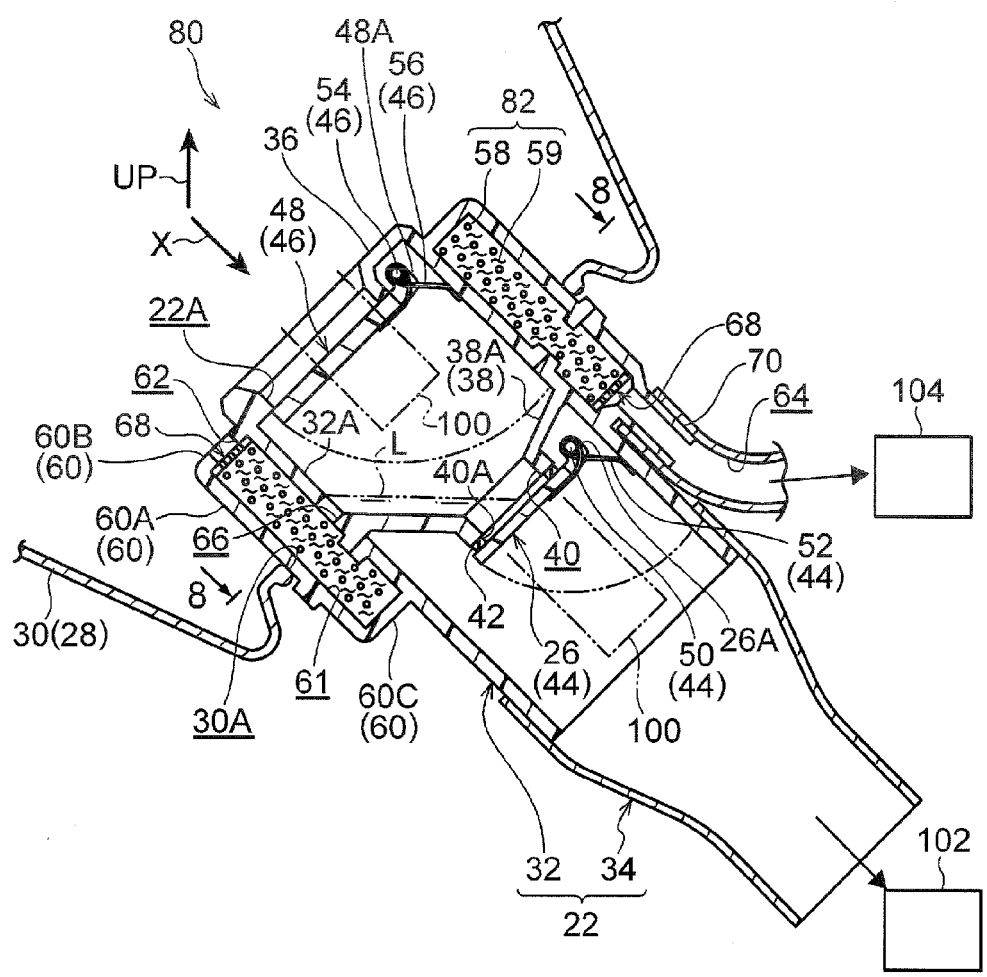
FIG. 7 is a cross-sectional view showing a refueling portion structure of a fuel tank of a second embodiment of the present invention.
Figure 8:
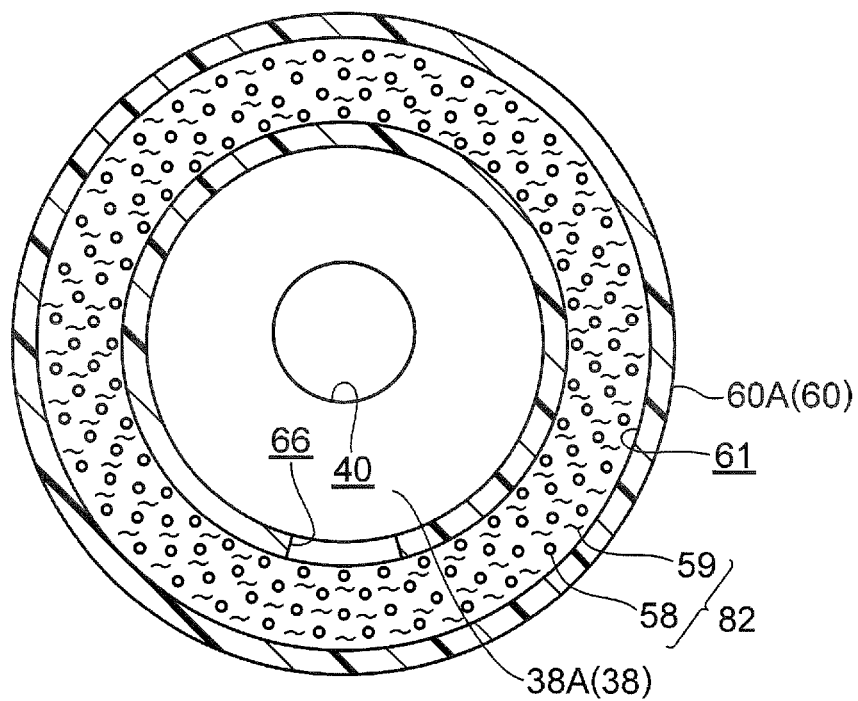
FIG. 8 is a cross-sectional view in which the refueling portion structure of the fuel tank of FIG. 7 is cut along line 8-8.

In the refueling portion structure 80 of the present embodiment, as shown in FIG. 7 and FIG. 8, the inner space 61 of the accommodating portion 60 is not partitioned by the partitioning members 72 and the partitioning member 73, and an absorbent adsorbing body 82, that is formed by dispersing the adsorbing material 58 between the fibers of the absorbent material 59, is accommodated in the accommodating portion 60.

As shown in FIG. 7, in the present embodiment, the atmospheric air passage 62 is formed at the radial direction other side (the lower side in FIG. 7) of the upper wall portion 60B of the accommodating portion 60. Therefore, the atmospheric air passage 62 and the connection port portion 70 are disposed at opposite sides with respect to one another in the radial direction.

Further, as shown in FIG. 8, the plate member 68 is mounted to the inner surface of the lower wall portion 60C so as to cover the opening of the connection port portion 70 from the inner side.

Operation and effects of the refueling portion structure 80 of the present embodiment are described next. Note that description is omitted of operation and effects that are obtained by structures similar to those of the refueling portion structure 20 of the first embodiment.

In the refueling portion structure 80 of the present embodiment, the absorbent adsorbing body 82, in which the adsorbing material 58 is dispersed between the fibers of the absorbent material 59, is accommodated within the accommodating portion 60. Therefore, there is no need to partition the inner space 61 of the accommodating portion 60 as in the first embodiment, and the internal structure of the accommodating portion 60 can be made to be simple.

Figure 9:
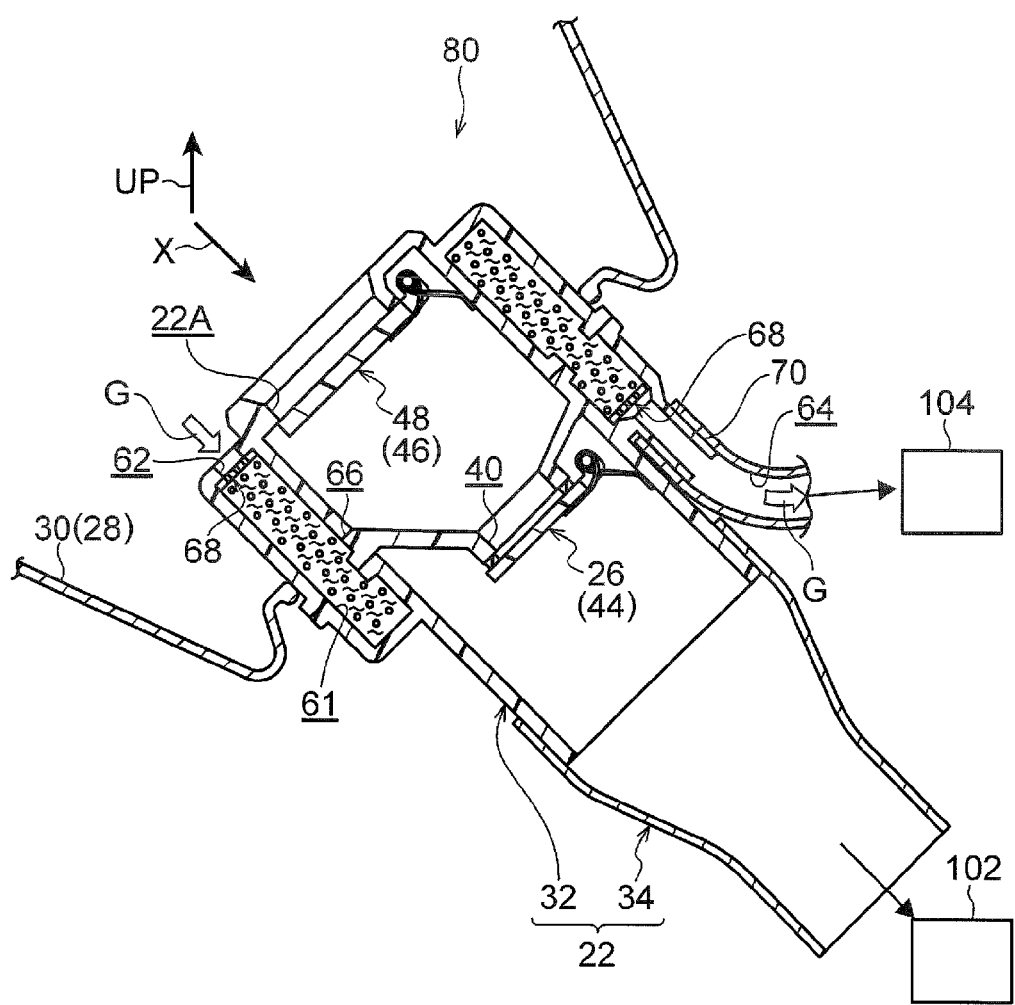
FIG. 9 is a cross-sectional view showing the refueling portion structure of the fuel tank of FIG. 7 in a state in which negative pressure is applied from the engine.

Further, in the refueling portion structure 80 of the present embodiment, as shown in FIG. 9, because the atmospheric air passage 62 and the connection port portion 70 are disposed at opposite sides with respect to one another in the radial direction, the path (the distance) until the vapor, that has flowed-in from the atmospheric air passage 62, reaches the connection port portion 70 is long. Due thereto, the vapor fuel that has been adsorbed by the adsorbing material 58 of the absorbent adsorbing body 82 can be desorbed efficiently over the wide range of the absorbent adsorbing body 82.

In the refueling portion structure 20 of the first embodiment, there is a structure in which the first opening/closing portion 44 and the second opening/closing portion 46 are provided within the filler pipe 22, but the present invention is not limited to this structure. For example, there may be a structure in which only the first opening/closing portion 44 is provided within the filler pipe 22. Further, an opening/closing portion, that includes an opening/closing valve that is pushed-open by the refueling nozzle 100, may be provided within the filler pipe 22 separately from the first opening/closing portion 44 and the second opening/closing portion 46. Note that the above-described structure may be applied to the refueling portion structure 80 of the second embodiment.

Further, in the refueling portion structure 20 of the first embodiment, the absorbent material 59 that is accommodated in the accommodating portion 60 contacts the partitioning member 73, but the present invention is not limited to this structure. The absorbent material 59 may be made to not contact the partitioning member 73, i.e., a gap may be formed between the partitioning member 73 and the absorbent material 59. Similarly, in the refueling portion structure 20 of the first embodiment, the absorbent material 59 that is accommodated in the accommodating portion 60 contacts the partitioning members 72, but the present invention is not limited to this structure. The absorbent material 59 may be made to not contact the partitioning members 72, i.e., gaps may be formed between the partitioning members 72 and the absorbent material 59.

Although embodiments of the present invention have been described above, the present invention is not limited to the above description, and, of course, can be embodied by being modified in various ways other than those described above within a scope that does not depart from the gist thereof.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A refueling portion structure of a fuel tank, comprising:
   a refueling pipe that has a refueling port into which a refueling nozzle is to be inserted, that is connected to a fuel tank, and that sends liquid fuel, supplied from the refueling nozzle, to the fuel tank;
   an opening/closing valve that is provided on a flow path within the refueling pipe and closes the flow path, and that, when pushed by the refueling nozzle, opens the flow path;
   an accommodating portion that is provided at an outer side of the refueling pipe, that accommodates at an interior thereof an adsorbing material that adsorbs vapor fuel that has formed due to the liquid fuel evaporating, that communicates with the flow path further toward the refueling port side than the opening/closing valve, and into which the liquid fuel can flow;
   an atmospheric air passage, by which the accommodating portion communicates with atmospheric air; and
   a vapor movement passage, by which the accommodating portion communicates with an engine, and that is for moving vapor that is within the accommodating portion to the engine due to negative pressure from the engine,
   wherein:
   an absorbent material that absorbs the liquid fuel is accommodated at the interior of the accommodating portion,
   the interior of the accommodating portion is partitioned, by a partitioning member in which are provided openings of a size that restricts passage of the adsorbing material and the absorbent material, into an adsorbing material accommodating space in which the adsorbing material is accommodated, and an absorbent material accommodating space in which the absorbent material is accommodated,
   the adsorbing material accommodating space communicates with the atmospheric air passage, and
   the absorbent material accommodating space communicates with the flow path further toward the refueling port side than the opening/closing valve.

2. The refueling portion structure of a fuel tank of claim 1, wherein the absorbent material is structured by fibers.

3. The refueling portion structure of a fuel tank of claim 1, wherein the accommodating portion is disposed in a peripheral direction of the refueling pipe.

4. A refueling portion structure of a fuel tank, comprising:
   a refueling pipe that has a refueling port into which a refueling nozzle is to be inserted, that is connected to a fuel tank, and that sends liquid fuel, supplied from the refueling nozzle, to the fuel tank;
   an opening/closing valve that is provided on a flow path within the refueling pipe and closes the flow path, and that, when pushed by the refueling nozzle, opens the flow path;

an accommodating portion that is provided at an outer side of the refueling pipe, that accommodates at an interior thereof an adsorbing material that adsorbs vapor fuel that has formed due to the liquid fuel evaporating, that communicates with the flow path further toward the refueling port side than the opening/closing valve, and into which the liquid fuel can flow;

an atmospheric air passage, by which the accommodating portion communicates with atmospheric air; and a vapor movement passage, by which the accommodating portion communicates with an engine, and that is for moving vapor that is within the accommodating portion to the engine due to negative pressure from the engine, wherein:

an absorbent material that absorbs the liquid fuel is accommodated at the interior of the accommodating portion, the absorbent material is structured by fibers, and the adsorbing material is dispersed between the fibers of the absorbent material.

5. The refueling portion structure of a fuel tank of claim 4, wherein the accommodating portion is disposed in a peripheral direction of the refueling pipe.

* * * * *